US010708226B2

(12) United States Patent
Cathrow et al.

(10) Patent No.: US 10,708,226 B2
(45) Date of Patent: Jul. 7, 2020

(54) DOMAIN NAME RESOLUTION

(71) Applicant: VERISIGN, INC., Reston, VA (US)

(72) Inventors: Andrew Cathrow, Ashburn, VA (US); Stephen Daniel James, South Riding, VA (US)

(73) Assignee: VERISIGN, INC., Reston, VA (US)

( * ) Notice: Subject to any disclaimer, the term of this patent is extended or adjusted under 35 U.S.C. 154(b) by 132 days.

(21) Appl. No.: 15/010,155

(22) Filed: Jan. 29, 2016

(65) Prior Publication Data

US 2017/0222974 A1 Aug. 3, 2017

(51) Int. Cl.
*H04L 29/06* (2006.01)
*H04L 29/12* (2006.01)
*H04L 29/08* (2006.01)

(52) U.S. Cl.
CPC ...... *H04L 63/0236* (2013.01); *H04L 61/1511* (2013.01); *H04L 63/0428* (2013.01); *H04L 63/06* (2013.01); *H04L 63/08* (2013.01); *H04L 63/1416* (2013.01); *H04L 67/10* (2013.01); *H04L 67/42* (2013.01)

(58) Field of Classification Search
CPC ............. H04L 63/0236; H04L 61/1511; H04L 63/0428; H04L 63/06; H04L 63/08; H04L 63/1416; H04L 67/10; H04L 67/42
See application file for complete search history.

(56) References Cited

U.S. PATENT DOCUMENTS

| 7,680,876 | B1 * | 3/2010 | Cioli | G06F 11/1662 709/201 |
| 2003/0041091 | A1 * | 2/2003 | Cheline | H04L 29/12066 709/200 |
| 2006/0039352 | A1 * | 2/2006 | Karstens | H04L 29/12066 370/352 |
| 2010/0036959 | A1 * | 2/2010 | Trace | H04L 29/12066 709/228 |
| 2010/0121981 | A1 * | 5/2010 | Drako | H04L 61/1511 709/245 |

(Continued)

FOREIGN PATENT DOCUMENTS

WO 2012/162099 A1 11/2012

OTHER PUBLICATIONS

Tianyan, et al., Resolving Server IP Address of Service for Multiple Networks, 2013 Sixth International Symposium on Computational Intelligence and Design, 2013, vol. 1 (Year: 2013).*

(Continued)

*Primary Examiner* — Luu T Pham
*Assistant Examiner* — Harvey I Cohen
(74) *Attorney, Agent, or Firm* — Artegis Law Group, LLP

(57) ABSTRACT

A method, system, apparatus, and computer-readable memory containing instructions include receiving, at an agent operating on a client device, a (domain name system) DNS resolution request for a domain name. The DNS resolution request is transmitted to a first DNS server including a firewall service and a second DNS server within a local network to the client device. Responses to the DNS resolution request from the first and second DNS server are received. The agent determines how to resolve the DNS resolution request based on one or more of the received responses.

20 Claims, 4 Drawing Sheets

(56) References Cited

U.S. PATENT DOCUMENTS

| | | | | |
|---|---|---|---|---|
| 2010/0242092 | A1* | 9/2010 | Harris | H04L 63/08 726/3 |
| 2013/0179555 | A1* | 7/2013 | Neumann | H04L 69/28 709/223 |
| 2014/0052822 | A1* | 2/2014 | Rodriguez Rodriguez | H04L 67/2814 709/218 |
| 2015/0081926 | A1* | 3/2015 | White | H04L 67/1008 709/245 |
| 2015/0350154 | A1* | 12/2015 | Myla | H04L 61/1511 709/245 |
| 2016/0197898 | A1* | 7/2016 | Hozza | H04L 63/1466 713/168 |
| 2017/0149730 | A1* | 5/2017 | Baughman | H04L 61/1511 |

OTHER PUBLICATIONS

Jung et al., Domain Name to IP Address Resolution System with Multiple Name Servers Adaptable to MANETs, IEEE 11th Internl Conf on Trust, Security and Privacy in Computing and Comm, 2012 (Year: 2012).*

Fioreze et al., Extending the Domain Name System (DNS) to provide geographical addressing vehicular ad-hoc networks (VANETs), IEEE Vehicular Networking Conference, 2011 (Year: 2011).*

Partial European Search Report for Application No. 17153585.9, dated Jun. 2, 2017, 12 pages.

Extended European Search Report for EP Application No. 17153585.9, dated Sep. 8, 2017, 11 pages.

* cited by examiner

DOMAIN NAME RESOLUTION

TECHNICAL FIELD

This disclosure generally relates to Domain Name Service (DNS) resolution. In particular, this disclosure relates to methods and systems for DNS resolution for DNS requests and providing dependent responses.

BACKGROUND

The DNS system utilizes a hierarchical structure to associate fully qualified domain names to a particular IP address in response to a DNS query. For example, if a user visits the website www.example.com on their computer's Internet browser, typically, the stub resolver on the computer would (1) first check its own DNS cache for a suitable response; (2) if not available in cache, query a recursive name server or possibly each level of the delegation graph from the root DNS server downward with the same information, expecting a reply. If the queried system has the information or is authoritative for the precise question, it provides a response or error. If it does not but knows who is, it provides a delegation/referral to the child that should have more precise information. To leverage larger caching mechanisms, a DNS resolver (recursive name server) may be used between steps (1) and (2). Because a DNS resolver services many users, it typically holds a larger cache, helping to reduce the load on root servers and registry servers and often minimize response times for users because it is commonly topologically closer to the client. A DNS resolver may also act as a recursive name server, handling the multiple transactions and following delegations/referral chains between different name servers to resolve the final IP address for the resource in question, simply passing the final answer back to the user's computer. A DNS resolver may ultimately provide in its response a network layer identifier or service location id, which in some instances may be the same.

Some DNS servers provide a firewall service that supports basic filtering of DNS queries based on the source IP address of the original querying machine. For example, some servers may compare the source IP address to whitelists or blacklists of IP addresses and allow or disallow the IP address accordingly. Other servers may use the source IP address to approximate the location (geolocation) of the query source machine, and use this location information to customize the response by returning an IP address of a resource server that is thought to be closer in proximity than another. In all of these cases, generally, once the response is allowed, the DNS response returns the IP address (or network layer identifier or service location id) of a machine that will provide access to the resource server. This IP address, the network layer identifier and service location id, is resolved regardless of the status of the user's permission to ultimately use the resource.

These DNS servers that provide a firewall service are generally accessed based on a configuration of an internal recursive server at a customer's own network. However, when a client device is used outside of the customer's own network, then the client device inherits the recursive configuration from an "off-net" location, meaning a location that is off the network of the customer's network. When resolving DNS requests while the client device is in the off-net location, the recursive configuration may not direct DNS requests to the DNS server that provides the customer's firewall service.

Further, when a client device is not within the customer's own network, the client device cannot access an internal version of a split zone.

SUMMARY

A method, system, and computer-readable memory containing instructions include receiving, at an agent operating on a client device, a (domain name system) DNS resolution request for a domain name; transmitting the DNS resolution request to a first DNS server, the first DNS server including a firewall service; receiving a response to the DNS resolution request from the first DNS server; transmitting the DNS resolution request to second DNS server, the second DNS server being in a local network to the client device; receiving a response to the DNS resolution request from the second DNS server; and determining, by the agent operating on the client device, how to resolve the DNS resolution request based on the response to the DNS resolution request from at least one of the first DNS server and the response to the DNS resolution request from the second DNS server.

According to some examples, the response from the first DNS server includes information indicating that the domain name included in the request is a malicious site and further includes information identifying an address of a redirected domain name; the response from the second DNS server includes information identifying an address of the domain name included in the DNS request; and the agent operating on the client device resolves the DNS resolution request based on the address of the redirected domain name.

According to some examples, the response from the first DNS server includes information identifying a first address of a domain name included in the DNS resolution request; the response from the second DNS server includes information identifying a second address of the domain name included in the DNS resolution request; and the agent operating on the client device resolves the DNS resolution request based on the second address of the domain name.

According to some examples, the agent is configured to change a local DNS service configuration to point back to an address of the client device; the agent is further configured to monitor the local DNS service configuration; and when the local DNS service configuration is updated due to a dynamic host configuration protocol update, the agent is configured to change the updated local DNS service configuration to point back to the address of the client device.

According to some examples, the method includes probing, by the agent on the client device, the local network; determining whether the first DNS server is accessible by the agent; and authenticating, by the agent via an encrypted communication channel, the agent with the firewall service when it is determined that the first DNS server is accessible by the agent.

According to some examples, the method includes providing, by the agent, domain name system security extensions (DNSSEC) validation.

According to some examples, transmitting the DNS resolution request to the first DNS server and transmitting the DNS resolution request to the second DNS server occur simultaneously.

It is to be understood that both the foregoing general description and the following detailed description are exemplary and explanatory only and are not restrictive of the application, as claimed.

The accompanying drawings, which are incorporated in and constitute a part of this specification, illustrate embodi-

DETAILED DESCRIPTION

Reference will now be made in detail to the exemplary embodiments. Wherever possible, the same reference numbers will be used throughout the drawings to refer to the same or like parts.

As noted above, DNS servers that provide a firewall service are generally accessed based on a configuration of an internal recursive server at a customer's own network. However, when a client device is used outside of the customer's own network, then the client device inherits the recursive configuration from an off-net location. When resolving DNS requests while the client device is in the off-net location, the recursive configuration may not direct DNS requests to the DNS server that provides the customer's firewall service.

Even if the client device is configured to point to the DNS server with the firewall service, queries from the client device may not utilize the firewall service since the DNS firewall service could not recognize the source IP address of the client device. Still further, the client device would not be able to access any intranet server at the off-net location. Still further, the firewall service would not have DNS responses for servers at the off-net location, preventing the client device from accessing local resources.

In order to address this problem, a client device may include an agent that is configured to run a local DNS service using a loopback interface of the local machine. The agent is configured to change a local DNS service configuration to point to the loopback/localhost address. The agent may further locate a DNS server including a firewall service of the client device. The agent may authenticate itself, for example, with the firewall service through an encrypted communication channel. Upon receiving a DNS request, the agent may transmit the DNS request to the DNS server including the firewall service and to a local DNS server. The agent may resolve the DNS request based on responses to the DNS requests to the DNS server including the firewall service and the local DNS server.

Figure 1:
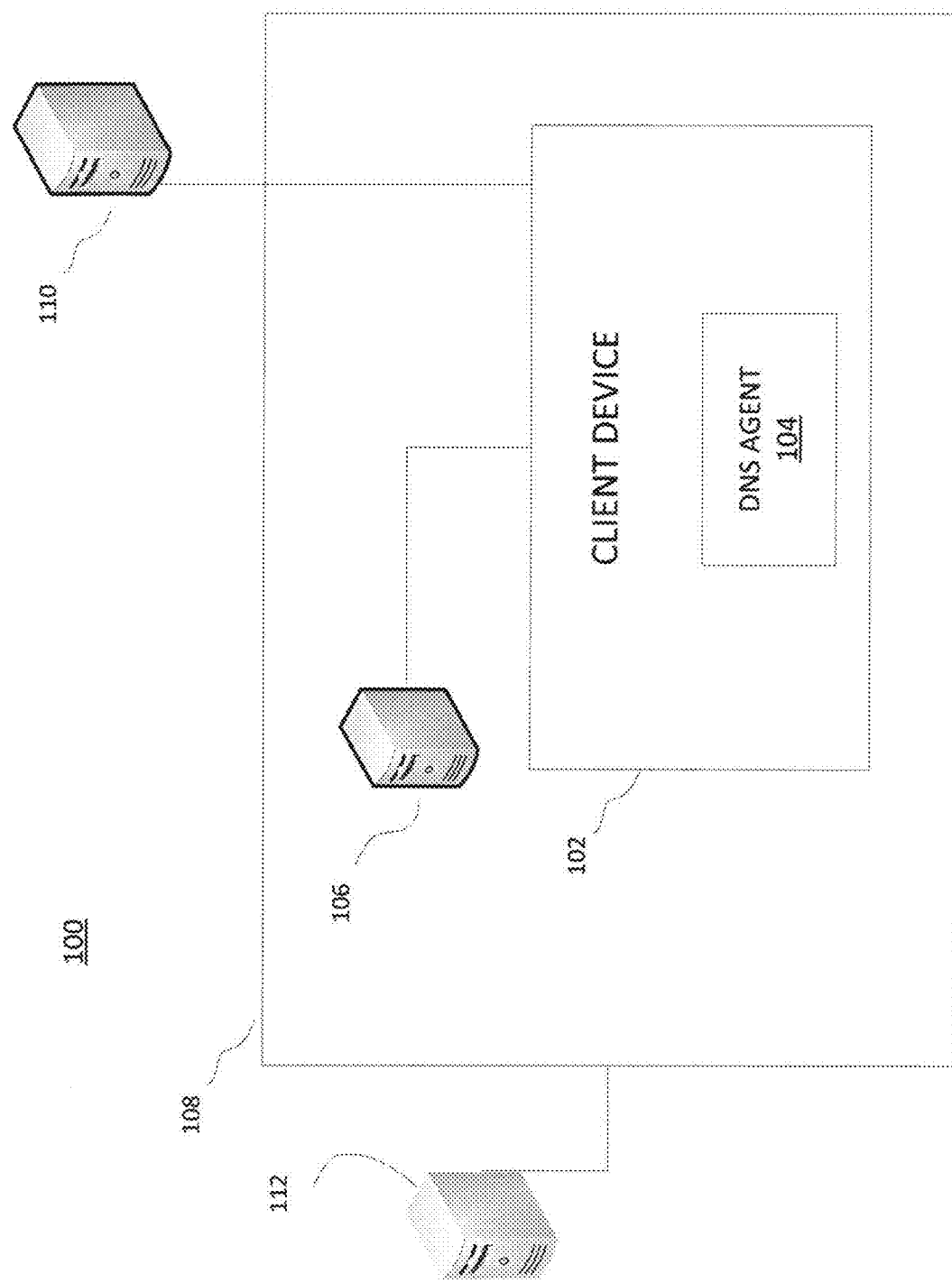
FIG. 1 illustrates a system environment, in accordance with some examples of the present disclosure.

FIG. 1 illustrates an example system environment 100 in accordance with some examples of the present disclosure. As shown in FIG. 1, a client device 100 is depicted. Client device 102 may include DNS agent 104 that is configured to receive and process DNS requests as discussed herein.

The client device 102 including DNS agent 104 may be implemented in software as software modules or programs on one or more computing systems. For example, the functionality of the client device 102 and DNS agent 104 comprise one or more applications, which may comprise one or more computer units of computer-readable instructions which, when executed by a processor, cause one or more computers to perform steps of a method. In particular, the exemplary architecture in FIG. 1. may support execution of program code on one or more computers to accomplish the overall method. Computer-readable instructions may be stored on a computer-readable medium, such as a memory or disk. Such media typically provide non-transitory storage. One or more of the components depicted in FIG. 1. may be hardware components or combinations of hardware and software such as, for example, special purpose computers or general purpose computers. A computer or computer system may also comprise an internal or external database. The database may comprise one or more individual databases or databases configured to act together. The database may be implemented in a commercial, open source, or proprietary database program or may be contained in log files, flat files, or any other data storage mechanism. The components of a computer or computer system may, among other things, connect through a local bus interface or over a local or wide area network. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN) and/or other suitable connections.

System environment 100 further includes a local DNS server 106 that manages DNS requests from a local network 108 in which the client device 102 is operating.

System environment 100 further includes DNS server 108. DNS server 108 may further include a firewall service that the client device is a customer of. According to some embodiments, DNS server 108 may be implemented as a recursive DNS server.

System environment 100 further includes a dynamic host configuration protocol (DHCP) server 112 that provides network configuration information to client device 102, including the IP address, netmask, and default gateway to the client device.

It may be appreciated that additional devices may reside within system environment 100.

Figure 2:
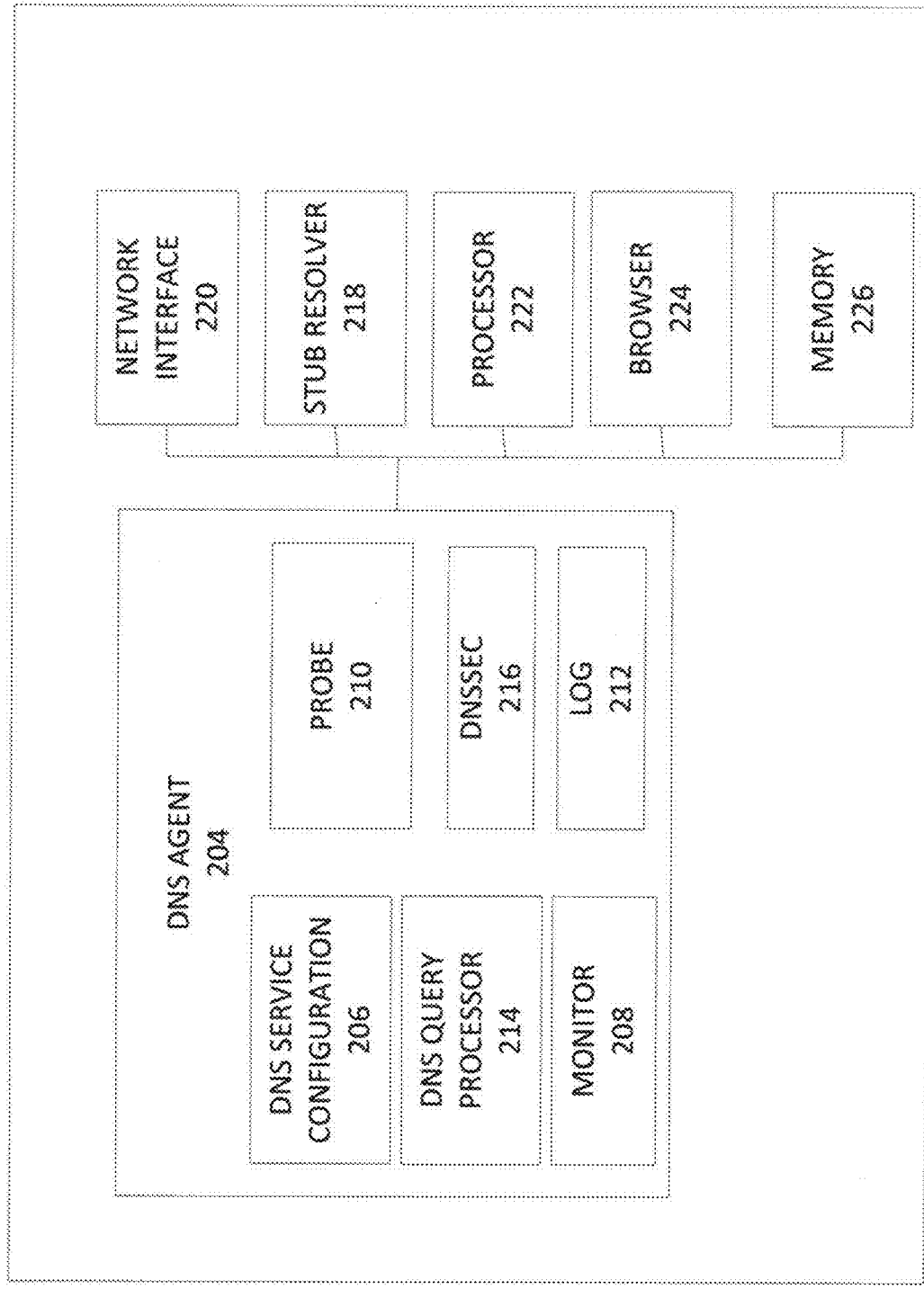
FIG. 2 illustrates a client device in accordance with some embodiments of the present disclosure.

FIG. 2 illustrates a client device 200 in accordance with some examples of the present disclosure. Client device 200 depicted in FIG. 2 may be implemented as client device 102 in FIG. 1. As shown in FIG. 2, client device 200 includes DNS agent 204, to which a unique identifier may be assigned, for example, a public/private key pair. DNS agent 204 includes a DNS service configuration 206 that includes information identifying one or more DNS servers to resolve DNS requests, for example, a local DNS server, a DNS server including a firewall service, etc. Upon launch, the DNS service configuration 206 may import the network configuration of the device, for example, from static configuration or via the DHCP server 112. The DNS service configuration 206 may run a local DNS service on port 53 using a loopback interface of the client device. The DNS service configuration 206 may change the local DNS service configuration to point to the loopback/local host address 127.0.0.1.

DNS agent 204 further includes a monitor 208. Monitor 208 may monitor the configuration information stored in DNS service configuration 206 in order to determine if the DNS server information is reset, for example, via DHCP server 112. If the DNS server information is reset, the monitor 208 may revert the DNS information back to the loopback/localhost address 127.0.0.1.

DNS agent 204 further includes probe 210. Probe 210 may probe the network environment to see if the agent has access to the DNS server 108 including the firewall service.

If the agent has access to the DNS server 108, the probe 210 may connect to firewall service at the DNS server 108 through an encrypted communication channel, for example, an encrypted HTTPS tunnel, DNS over transport layer security (TLS), DNS over datagram transport layer security (DTLS), etc. The probe 210 may authenticate the agent by providing credentials to the firewall service and may further ensure that the firewall service is authentic, for example, by validating it's public key.

If the probe 210 does not connect to the firewall service, for example as a result of a "captive portal", the probe may generate an entry in log 212. The probe 210 may further attempt to authenticate with the firewall service again, for example, once, on a periodic basis, until access is permitted, etc.

According to some embodiments, if the probe 210 has not authenticated with the firewall service, then all DNS requests may be forwarded to local DNS server 106, or to another local DNS server, not shown.

DNS agent 204 may further include a log 212. Log 212 may be used to store all DNS queries.

DNS agent 204 may further include a DNS query processor 214. DNS query processor 214 may receive DNS queries from stub resolver 218 based on the loopback to the local address of the client device and process queries based on the information stored in the DNS service configuration 206, as more fully discussed below.

Client device 200 may further include stub resolver 218 to direct DNS requests to the local address of the client device where the DNS agent 204 processes the DNS requests as discussed herein.

Client device 200 may further include a network interface 220 to facilitate communication between the client device 200, the local DNS server 106, and the DNS server 110 including the firewall service.

Client device 200 may further include one or more processors 204 to facilitate the functionality as discussed herein.

Client device 200 may further include browser 204 to facilitate transmitting to and receiving from world wide web content.

Client device 226 may further include memory 226. Memory 226 may store policy information that indicates how to route and handle DNS requests. For example, the policy information may include whether to enforce DNSSEC validation, whether to log DNS queries, exceptions to logging queries, directing the agent to act as a dumb proxy by merely passing all DNS requests to the local DNS server, directing the agent to route all DNS requests to the DNS server including the DNS firewall service; directing the agent to provide advanced query handing rules, etc.

According to some examples, DNS agent 204 may include DNSSEC 216 for providing domain name system security extensions (DNSSEC) validation.

According to some examples, DNS agent 204 may include a local cache in order to store previous DNS requests and results.

When a DNS request is transmitted to a DNS server, the following responses may be received:

NOERROR Meaning that the request was successfully resolved. In this case the stub resolver returns the response to the calling application NXDOMAIN—Meaning that there is no such domain/record. In this case the stub resolver returns an error to the calling application SERVFAIL—Meaning that the DNS server encountered an error. This can either mean that there was an internal error with the DNS server. This error code is also returned if DNSSEC validation on the recursive server determined that the record was not correctly signed. In this case the stub resolver tries to issue the query against the next DNS server it has configured. If one of the DNS servers returns a NOERROR or NXDOMAIN response then this is passed to the calling application. If all of the configured servers return SERVFAIL then an error is passed to the calling application Another possibility is that a network timeout occurs which may take as long as 30 seconds before the calling application is notified that the request timed out.

When processing a DNS request, if the query name is within a domain specified as a query domain from DHCP options (e.g., mail.local.example.com), then the agent may route the request to the local DNS server, regardless of any response that may be received from the DNS server with the firewall service.

If the query name is on the blacklist as determined by the firewall service, then a NOERROR answer is returned pointing to a redirected domain. The agent may then resolve the request based on the redirected domain.

If the query name is successfully resolved by the DNS server operating the firewall service, and is not on the blacklist than the NOERROR response is returned. The agent may then compare the address received with the address received from the local DNS server. If the addresses are different, then the agent may resolve the request based on the address received from the local DNS server. This ensures that where there is a split zone, meaning an internal and external site for the same domain, the client device is capable of accessing the local domain.

If the query name is not found then NXDOMAIN is returned. The agent may then rely on the result received from the local DNS server to resolve the DNS query.

Figure 3:
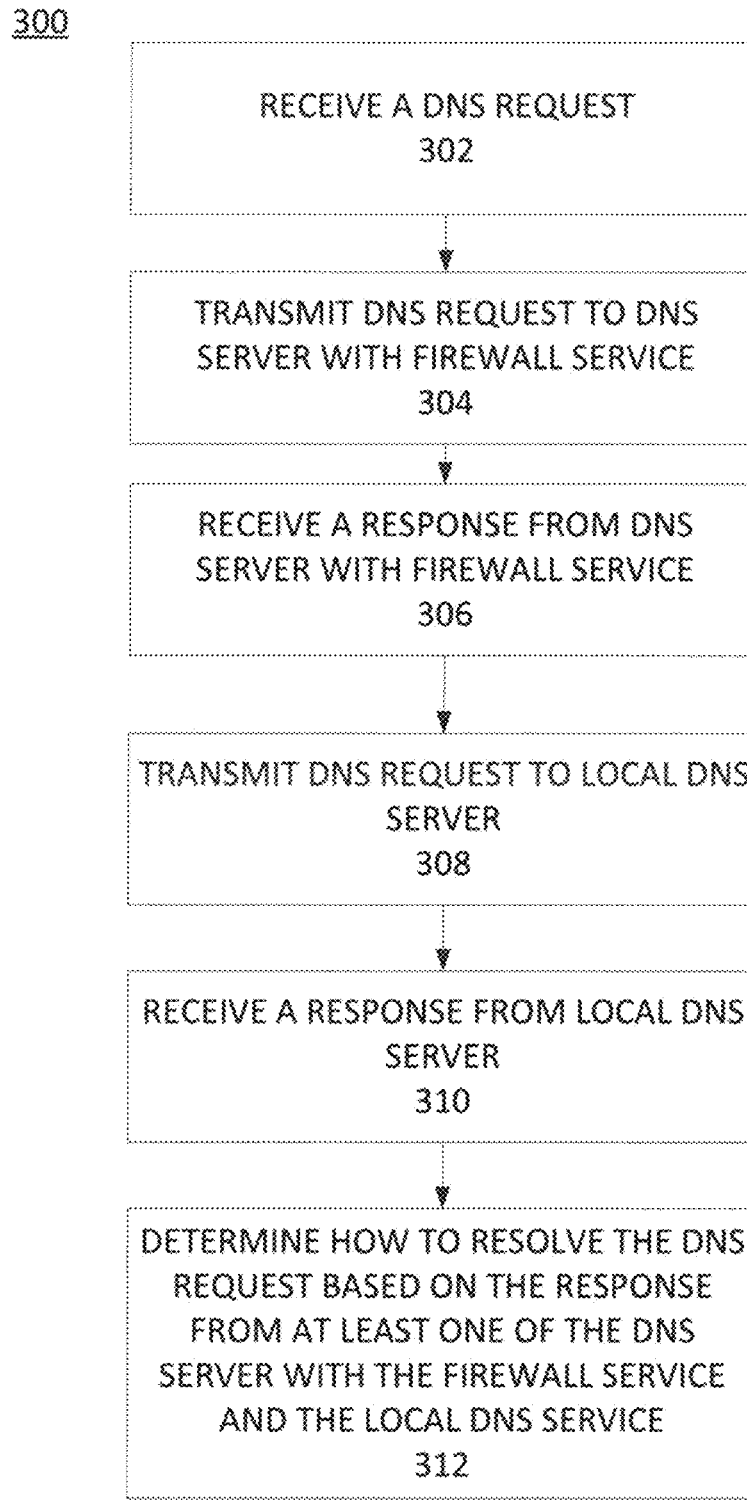
FIG. 3 illustrates an example flow diagram of a process for determining how to resolve DNS requests, in accordance with some examples of the present disclosure.

FIG. 3 illustrates an example process 300 for processing a DNS request. The process depicted in FIG. 3 may be performed by agent 104 in FIG. 1 or agent 204 depicted in FIG. 2. As shown in FIG. 3, at block 302, a DNS request may be received at the agent operating on the client device. The DNS request may be the result of a user operating a browser and visiting a website, a program running on the user's computer initiates an online transaction, or any other possible reason that a user's computer would have the need to translate a fully qualified domain name, such as www.example.com, into its corresponding IP address.

The DNS request may be processed at a stub resolver operating on the client device. The stub resolver may forward the DNS request to the agent based on the configuration of a local host address.

At block 304, the DNS request is transmitted to a DNS server with a firewall service. The agent operating on the client device transmits the DNS request to the DNS server with the firewall service operating thereon based on the information stored in the DNS service configuration.

At block 306, a response is received from the DNS server with the firewall service.

At block 308, the DNS request is transmitted to a local DNS server. The agent operating on the client device transmits the DNS request to the local DNS server based on the information stored in the DNS service configuration.

At block 310, a response is received from the local DNS server.

At block 312, the agent determines how to resolve the DNS request based on the response from at least one of the DNS server with the firewall service operating thereon and the local DNS server.

According to some embodiments, the request to the DNS server with the firewall service and the request to the local DNS server may be transmitted simultaneously or at different times. Thus, the agent does not wait for a response to be received from the DNS server with the firewall server before the agent transmits the DNS request to the local DNS server.

According to some examples, the response from the (first) DNS server including the firewall service includes information indicating that the domain name included in the request is a malicious site and further includes information identifying an address of a redirected domain name. The response from the (second) local DNS server includes information identifying an address of the domain name included in the DNS request. Since the client device is authenticated with firewall service, the agent operating on the client device resolves the DNS resolution request based on the address of the redirected domain name that is received based on the information from the firewall service.

According to some examples, the response from the (first) DNS server including the firewall service includes information identifying a first address of a domain name included in the DNS resolution request. The response from the (second) local DNS server includes information identifying a second address of the domain name included in the DNS resolution request. The agent operating on the client device resolves the DNS resolution request based on the second address of the domain name. In other words, where there is a split zone, the agent will resolve the DNS request based on the information from the local DNS server.

According to some examples, the agent is configured to change a local DNS service configuration to point back to an address of the client device. The agent is further configured to monitor the local DNS service configuration. When the local DNS service configuration is updated due to a dynamic host configuration protocol update, the agent is configured to change the updated local DNS service configuration to point back to the address of the client device. This ensures that DNS request is directed to the local host address and that the agent operating on the client device handles the DNS request.

According to some embodiments, the agent may probe the local network. The agent may further determine whether the first DNS server is accessible by the agent. The agent, via an encrypted channel, may authenticate agent with the firewall service when it is determined that the first DNS server is accessible by the agent.

According to some embodiments, the agent may provide domain name system security extensions (DNSSEC) validation.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 4:
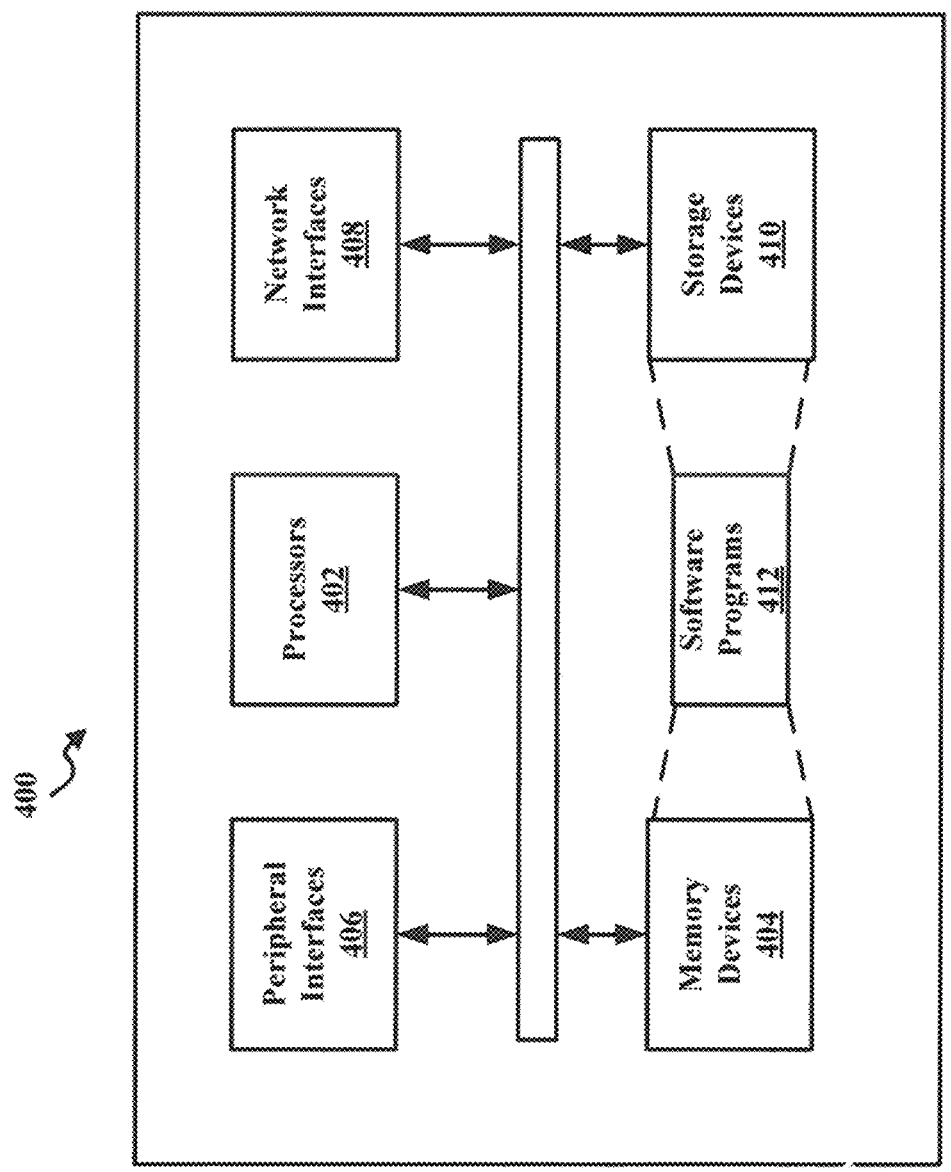
FIG. 4 illustrates a client device, in accordance with some examples of the present disclosure.

For example, FIG. 4 illustrates an example of a hardware configuration for a computer device 400, which can be used to perform one or more of the processes described above. While FIG. 4 illustrates various components contained in the computer device 400, FIG. 4 illustrates one example of a computer device and additional components can be added and existing components can be removed. The components described in FIG. 4 may be implemented in device 102 and device 200.

The computer device 400 can be any type of computer devices, such as desktops, laptops, servers, etc., or mobile devices, such as smart telephones, tablet computers, cellular telephones, personal digital assistants, etc. As illustrated in FIG. 4, the computer device 400 can include one or more processors 402 of varying core configurations and clock frequencies. The computer device 400 can also include one or more memory devices 404 that serve as a main memory during the operation of the computer device 400. For example, during operation, a copy of the software that supports the DNS operations can be stored in the one or more memory devices 404. The computer device 400 can also include one or more peripheral interfaces 406, such as keyboards, mice, touchpads, computer screens, touchscreens, etc., for enabling human interaction with and manipulation of the computer device 400.

The computer device 400 can also include one or more network interfaces 408 for communicating via one or more networks, such as Ethernet adapters, wireless transceivers, or serial network components, for communicating over wired or wireless media using protocols. The computer device 400 can also include one or more storage devices 410 of varying physical dimensions and storage capacities, such as flash drives, hard drives, random access memory, etc., for storing data, such as images, files, and program instructions for execution by the one or more processors 402.

Additionally, the computer device 400 can include one or more software programs 412 that enable the functionality described above. The one or more software programs 412 can include instructions that cause the one or more processors 402 to perform the processes described herein. Copies of the one or more software programs 412 can be stored in the one or more non-transitory computer-readable mediums such as memory devices 404 and/or on in the one or more storage devices 410. Likewise, the data, for example, DNS records, utilized by one or more software programs 412 can be stored in the one or more memory devices 404 and/or on in the one or more storage devices 410.

In implementations, the computer device 400 can communicate with other devices via one or more networks. The other devices can be any types of devices as described above. The network can be any type of network, such as a local area network, a wide-area network, a virtual private network, the Internet, an intranet, an extranet, a public switched telephone network, an infrared network, a wireless network, and any combination thereof. The network 416 can support communications using any of a variety of commercially-available protocols, such as TCP/IP, UDP, OSI, FTP, UPnP, NFS, CIFS, and the like. The network 416 can be, for example, a local area network, a wide-area network, a virtual private network, the Internet, an intranet, an extranet, a public switched telephone network, an infrared network, a wireless network, and any combination thereof.

The computer device 400 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 400 as described above need not be enclosed within a single enclosure or even located in close proximity to one another. Those skilled in the art will appreciate that the above-described componentry are examples only, as the computer device 400 can include any type of hardware componentry, including any necessary accompanying firmware or software, for performing the disclosed implementations. The computer device 400 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Other embodiments of the disclosure will be apparent to those skilled in the art from consideration of the specification and practice of the embodiments disclosed herein. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A computer-implemented method, comprising:
   receiving, at an agent operating on a client device, a domain name system (DNS) resolution request for a domain name;
   determining, by the agent and based on a DNS service configuration, a network configuration for the client device specified in the DNS service configuration, wherein the client device is included in a first local network that is not protected by a first firewall service;
   determining, by the agent and based on the DNS service configuration, that a first DNS resolution policy is applicable to the DNS resolution request, wherein the first DNS resolution policy specifies that one or more DNS resolution requests, upon reception by the client device when the client device is in the first local network, are to be resolved by:
   a first DNS server that includes the first firewall service, and
   a second DNS server that is included in the first local network;
   transmitting the DNS resolution request from the client device to the first DNS server;
   receiving a first response to the DNS resolution request from the first DNS server;
   transmitting the DNS resolution request from the client device to the second DNS server;
   receiving a second response to the DNS resolution request from the second DNS server; and
   upon receiving the first response and the second response, resolving, by the agent, the DNS resolution request using one of the first response or the second response.

2. The computer-implemented method of claim 1, wherein:
   the first response includes:
   information indicating that the domain name included in the DNS resolution request is a malicious site, and
   information identifying an address of a redirected domain name;
   the second response includes information identifying an address of the domain name included in the DNS resolution request; and
   the agent determines to resolve the DNS resolution request using the address of the redirected domain name.

3. The computer-implemented method of claim 1, wherein:
   the first response includes information identifying a first address of a domain name included in the DNS resolution request;
   the second response includes information identifying a second address of the domain name included in the DNS resolution request; and
   the agent determines to resolve the DNS resolution request using the second address of the domain name.

4. The computer-implemented method of claim 1, further comprising:
changing, by the agent, a local DNS service configuration included in the DNS service configuration to point back to an address of the client device;
monitoring the local DNS service configuration; and
when the local DNS service configuration is updated, based on a dynamic host configuration protocol update, to generate an updated local DNS service configuration, changing the updated local DNS service configuration to point back to the address of the client device.

5. The computer-implemented method of claim 1, further comprising:
probing, by the agent, the first local network;
determining whether the first DNS server is accessible by the agent when included in the first local network; and
authenticating, by the agent via an encrypted communication channel, the agent with the first firewall service when it is determined that the first DNS server is accessible by the agent when included in the first local network.

6. The computer-implemented method of claim 1, further comprising:
providing, by the agent, domain name system security extensions (DNSSEC) validation.

7. An apparatus, comprising:
at least one processor, implemented at least in part in hardware;
a memory, storing a set of instructions, which, when executed by the at least one processor, causes the at least one processor to:
receive, at an agent operating on a client device, a domain name system (DNS) resolution request for a domain name;
determine, by the agent and based on a DNS service configuration, a network configuration for the client device specified in the DNS service configuration, wherein the client device is included in a first local network that is not protected by a first firewall service;
determine, by the agent and based on the DNS service configuration, that a first DNS resolution policy is applicable to the DNS resolution request, wherein the first DNS resolution policy specifies that one or more DNS resolution requests, upon reception by the client device when the client device is in a first local network, are to be resolved by:
a first DNS server that includes the first firewall service, and
a second DNS server that is included in the first local network;
transmit the DNS resolution request from the client device to the first DNS server;
receive a first response to the DNS resolution request from the first DNS server;
transmit the DNS resolution request from the client device to the second DNS server;
receive a second response to the DNS resolution request from the second DNS server; and
upon receiving the first response and the second response, resolving, by the agent, the DNS resolution request using one of the first response or the second response.

8. The apparatus of claim 7, wherein:
the first response includes:
information indicating that the domain name included in the DNS resolution request is a malicious site, and
information identifying an address of a redirected domain name;
the second response includes information identifying an address of the domain name included in the DNS resolution request; and
the agent determines to resolve the DNS resolution request using the address of the redirected domain name.

9. The apparatus of claim 7, wherein:
the first response includes information identifying a first address of a domain name included in the DNS resolution request;
the second response includes information identifying a second address of the domain name included in the DNS resolution request; and
the agent determines to resolve the DNS resolution request using the second address of the domain name.

10. The apparatus of claim 7, wherein the set of instructions, which, when executed by the at least one processor, causes the at least one processor to further:
change a local DNS service configuration included in the DNS service configuration to point back to an address of the client device;
monitor the local DNS service configuration; and
when the local DNS service configuration is updated, based on a dynamic host configuration protocol update, to generate an updated local DNS service configuration, change the updated local DNS service configuration to point back to the address of the client device.

11. The apparatus of claim 7, wherein the set of instructions, which, when executed by the at least one processor, causes the at least one processor to further:
probe, by the agent, the first local network;
determine whether the first DNS server is accessible by the agent when included in the first local network; and
authenticate, by the agent via an encrypted communication channel, the agent with the first firewall service when it is determined that the first DNS server is accessible by the agent when included in the first local network.

12. The apparatus of claim 7, wherein the set of instructions, which, when executed by the at least one processor, causes the at least one processor to further provide, by the agent, domain name system security extensions (DNSSEC) validation.

13. One or more non-transitory computer-readable media containing instructions, which, when executed by one or more processors, cause the one or more processors to perform steps of:
receiving, at an agent operating on a client device, a domain name system (DNS) resolution request for a domain name;
determining, by the agent and based on a DNS service configuration, a network configuration for the client device specified in the DNS service configuration, wherein the client device is included in a first local network that is not protected by a first firewall service;
determining, by the agent and based on the DNS service configuration, that a first DNS resolution policy is applicable to the DNS resolution request, wherein the first DNS resolution policy specifies that one or more DNS resolution requests, upon reception by the client device when the client device is in the first local network, are to be resolved by:
a first DNS server that includes the first firewall service, and
a second DNS server that is included in the first local network;

transmitting the DNS resolution request from the client device to the first DNS server;
receiving a first response to the DNS resolution request from the first DNS server;
transmitting the DNS resolution request from the client device to the second DNS server;
receiving a second response to the DNS resolution request from the second DNS server; and
upon receiving the first response and the second response, resolving, by the agent, the DNS resolution request using one of the first response or the second response.

14. The one or more non-transitory computer-readable media of claim 13, wherein:
the first response from the first DNS server includes:
information indicating that the domain name included in the DNS resolution request is a malicious site, and
information identifying an address of a redirected domain name;
the second response from the second DNS server includes information identifying an address of the domain name included in the DNS resolution request; and
the agent determines to resolve the DNS resolution request using the address of the redirected domain name.

15. The one or more non-transitory computer-readable media of claim 13, wherein:
the first response includes information identifying a first address of a domain name included in the DNS resolution request;
the second response includes information identifying a second address of the domain name included in the DNS resolution request; and
the agent determines to resolve the DNS resolution request using the second address of the domain name.

16. The one or more non-transitory computer-readable media of claim 13, further comprising instructions, which, when executed by the one or more processors, cause the one or more processors to further perform the steps of:
changing, by the agent, a local DNS service configuration included in the DNS service configuration, to point back to an address of the client device;
monitoring, by the agent, the local DNS service configuration; and
when the local DNS service configuration is updated, based on a dynamic host configuration protocol update, to generate an updated local DNS service configuration, changing, by the agent, the updated local DNS service configuration to point back to the address of the client device.

17. The one or more non-transitory computer-readable media of claim 13, further comprising instructions, which, when executed by the one or more processors, cause the one or more processors to further perform steps of:
probing, by the agent, the first local network;
determining whether the first DNS server is accessible by the agent when included in the first local network; and
authenticating, by the agent via an encrypted communication channel, the agent with the first firewall service when it is determined that the first DNS server is accessible by the agent when included in the first local network.

18. The one or more non-transitory computer-readable media of claim 13, further comprising instructions, which, when executed by the one or more processors, cause the one or more processors to further perform a step of providing, by the agent, domain name system security extensions (DNS-SEC) validation.

19. The computer-implemented method of claim 1, wherein transmitting the DNS resolution request from the client device to the first DNS server and transmitting the DNS resolution request from the client device to the second DNS server occur simultaneously.

20. The apparatus of claim 7, wherein the at least one processor transmits the DNS resolution request from the client device to the first DNS server and transmits the DNS resolution request from the client device to the second DNS server simultaneously.

* * * * *